Patented Feb. 18, 1930

1,747,521

UNITED STATES PATENT OFFICE

ARTHUR LÜTTRINGHAUS, OF MANNHEIM, AND PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF NEW VAT DYESTUFFS

No Drawing. Application filed October 27, 1928, Serial No. 315,586, and in Germany October 25, 1926.

The present invention relates to the production of new vat dyestuffs, in particular to the production of alkylation products of condensation products of anthrapyrimidone and derivatives thereof.

The subject matter of the present application has been divided out from our copending application for an improvement in the manufacture and production of new vat dyestuffs Ser. No. 223,844, filed October 3, 1927.

We have found that new valuable vat dyestuffs are obtained by treating with alkylating agents the condensation products of anthrapyrimidones containing no substituents in the pyrimidone ring attached to the anthracene nucleus which products are obtainable according to our aforesaid application Ser. No. 223,844 by condensation of anthrapyrimidone, its substitution products and derivatives by means of alkaline condensing agents. The dyestuffs thus obtained dye cotton for the most part yellow shades and are distinguished by excellent properties as regards fastness.

These dyestuffs may be purified if necessary, for example, by treatment with oxidizing agents, or by recrystallization or by fractional precipitation from their solutions in concentrated sulfuric acid.

The following example will further illustrate the nature of the said invention but the invention is not limited thereto. The parts are by weight.

Example 10 parts of the condensation product obtainable according to Example 1 of our aforesaid application Ser. No. 223,844, 10 parts of p-toluene-sulfonic acid methyl ester and 10 parts of potassium carbonate are introduced into 400 parts of nitrobenzene, and heated to boiling for several hours while stirring. If the alkylation is not complete at the end of that time, it is completed by the addition of more p-toluene-sulfonic acid methyl ester and potash, and continued boiling. After cooling, the crystallized dyestuff is separated by filtration by suction and freed from solvents and by-products in the usual way. The dyestuff is a greenish-yellow crystalline powder, which gives a yellow-brown solution in sulfuric acid, and brownish-red dyeings on cotton from a vat of the same color. On exposure to the air, this color changes to a brilliant yellow extremely fast to soap and to chlorine. The dyestuff probabaly corresponds to the formula:

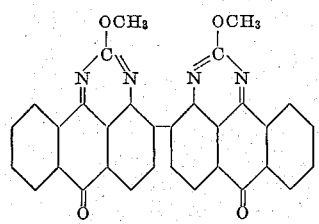

What we claim is:—

1. The process of producing new vat dyestuffs which consists in treating with alkylating agents the products obtainable by condensing anthrapyrimidones containing no substituents in the pyrimidone ring attached to the anthracene nucleus by means of alkaline condensing agents.

2. The process of producing a new vat dyestuff which consists in treating the product obtainable by condensing anthrapyrimidone by means of an alkaline condensing agent with a mixture of p-toluene-sulfonic acid methyl ester and potassium carbonate in nitrobenzene.

3. As new articles of manufacture new vat dyestuffs probably corresponding to the formula:

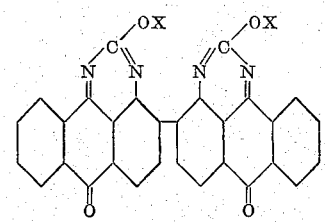

in which X is an alkyl group and obtainable by treating with alkylating agents the products obtainable by condensing anthrapyrimidones containing no substituents in the pyrimidone ring attached to the anthracene nucleus by means of alkaline condensing agents.

4. As new article of manufacture the new vat dyestuff probably corresponding to the formula:

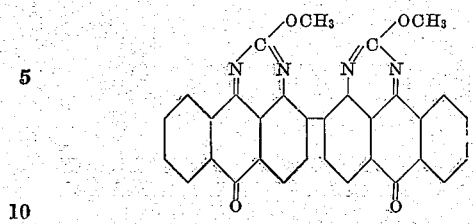

forming a greenish yellow crystalline powder, giving a yellow brown solution in concentrated sulfuric acid and from a brownish red vat brownish red dyeings on cotton, the color changing to a brilliant yellow on exposure to the air.

In testimony whereof, we affix our signatures.

ARTHUR LÜTTRINGHAUS.
PAUL NAWIASKY.
ARTUR KRAUSE.